(12) United States Patent
Flynn et al.

(10) Patent No.: US 6,851,896 B1
(45) Date of Patent: Feb. 8, 2005

(54) FLUID BARRIERS

(75) Inventors: Harry Eugene Flynn, Edmond, OK (US); Robert O. Martin, Edmond, OK (US); Charles A. Natalie, Edmond, OK (US)

(73) Assignee: Kerr-McGee Chemical, LLC, Oklahoma City, OK (US)

( * ) Notice: Subject to any disclaimer, the term of this patent is extended or adjusted under 35 U.S.C. 154(b) by 0 days.

(21) Appl. No.: 10/666,625

(22) Filed: Sep. 18, 2003

(51) Int. Cl.⁷ .............................................. B65G 53/00
(52) U.S. Cl. ........................ 406/197; 406/46; 406/47
(58) Field of Search ........................... 406/46, 47, 48, 406/86, 197; 75/535, 541, 565, 528

(56) References Cited

U.S. PATENT DOCUMENTS

| | | | |
|---|---|---|---|
| 2,868,622 A | | 1/1959 | Bennett et al. ................ 23/87 |
| 3,086,843 A | | 4/1963 | Evans et al. ................... 23/87 |
| 3,841,710 A | * | 10/1974 | Boland et al. ................ 406/11 |
| 4,129,337 A | * | 12/1978 | Hosaka et al. ................ 406/47 |
| 4,455,288 A | * | 6/1984 | Salter et al. ................ 423/612 |
| 4,852,994 A | * | 8/1989 | Lambertz et al. ......... 48/197 R |
| 4,871,284 A | * | 10/1989 | Duffy .......................... 406/49 |
| 4,961,911 A | | 10/1990 | Reis et al. .................... 423/72 |
| 5,193,942 A | * | 3/1993 | Berry et al. .................. 406/47 |
| 5,670,121 A | | 9/1997 | Elkins ......................... 423/74 |
| 5,955,037 A | * | 9/1999 | Holst et al. ................. 422/171 |

* cited by examiner

*Primary Examiner*—Joe Dillon, Jr.
(74) *Attorney, Agent, or Firm*—Law Office of Stanley K. Hill, PLC

(57) ABSTRACT

A fluid barrier along the inside surface of ductwork between a reactor and subsequent product separation and recovery apparatus to reduce the buildup of solids on the ductwork from a gaseous product mixture conveyed through the ductwork. Barrier fluid is sprayed along the internal surface of the ductwork to form a fluid barrier and cool the gaseous mixture. The barrier fluid can be comprised of a component of the gaseous mixture. The barrier fluid can be a liquid at the second temperature and converted to a gaseous state in the ductwork, using the heat of vaporization of the barrier fluid to help cool the gaseous mixture.

18 Claims, 3 Drawing Sheets

FLUID BARRIERS

FIELD OF THE INVENTION

The present invention generally relates to methods and apparatus for reducing the buildup of tacky solids from a gaseous product mixture on the internal surfaces of ductwork between a reactor and subsequent product separation and recovery apparatus, for example, impurity chlorides in the chlorination of metal oxides. More specifically, the present invention relates to reducing the buildup of chlorides on the internal surfaces of ductwork in the chlorination step of a chloride process for producing titanium metal or titanium dioxide, by forming a fluid barrier along the internal surface of the ductwork.

BACKGROUND OF THE INVENTION

The production of titanium tetrachloride ("$TiCl_4$") via the chlorination of titanium values in a titanium-containing starting material is generally known in the art. The production of $TiCl_4$ is useful, for example, in the production of titanium metal or titanium dioxide ("$TiO_2$").

As is known in the art, $TiCl_4$ can be produced by reacting chlorine gas with titanium-containing starting materials, typically in a fluid bed chlorinator. Titanium dioxide-containing ores used as starting materials contain a variety of impurities, notably including oxides of Fe, Mn, Ni, Si, Al, Nb, Zr, V, Mg, and Ca. Most of the impurities are chlorinated with the $TiO_2$ in the ore, and form volatile chlorides at the temperatures that typically characterize the chlorination process (that is, from about 800° C. to about 1400° C.).

The off-gases from the chlorination process comprise a gaseous mixture including CO, $CO_2$, $TiCl_4$, $N_2$, and $Cl_2$. The gaseous mixture also contains the volatile chlorides of the impurities discussed above as well as some residual solids (typically also chlorides) that are carried out of the chlorinator due to entrainment. The solids-laden gaseous mixture is conventionally transported through a duct from the top of the chlorinator to a device, for example, a cyclone, which separates solids from the gases. The ductwork between the chlorinator and the cyclone is frequently referred to as a crossover or chlorinator crossover.

As the gaseous mixture is transported to the cyclone through the ductwork, the gases cool, causing some of the chlorides to condense as tacky solids. The tacky solids can build up on the internal surface of the ductwork, creating blockage to the extent that the blockage can cause a pressure drop through the duct. If the pressure drop becomes too high the process may not be economical to operate, requiring a shutdown to clean the duct (for example, by sand blasting or through the use of mechanical devices such as chain flails) or change ducts. Decreasing or preventing the tacky solids build up and consequent blockage would allow longer run times between shutdowns and also allow usage of lower grade ores containing greater quantities of impurity metal oxides. Attempts have been made to cool the gaseous mixture rapidly before it enters the ductwork, but this approach requires major modifications to an existing chlorinator as well as extensive down time.

SUMMARY OF THE INVENTION

The present invention addresses the shortcomings of the prior art by forming a fluid barrier along the inside surface of ductwork used for conveying a gaseous product mixture containing materials that will otherwise form a tacky solids deposit on the ductwork, for example, volatile metal chlorides in the chlorination of titanium-containing starting materials. According to the present invention, a barrier fluid is sprayed at a second temperature, lower than the first temperature at which such metal chlorides are conventionally conveyed, along the internal surface of the ductwork to form a fluid barrier. In a preferred embodiment, the barrier fluid is a component of the gaseous mixture. In another preferred embodiment, the barrier fluid is a liquid at the second temperature and is converted to a gaseous state in the ductwork.

DESCRIPTION OF THE DRAWINGS

The present invention is illustrated by way of example in the following drawings in which like references indicate similar elements. The following drawings disclose various embodiments of the present invention for purposes of illustration only. The drawings are not intended to limit the scope of the invention.

DETAILED DESCRIPTION OF PREFERRED EMBODIMENTS OF THE INVENTION

Figure 1A:
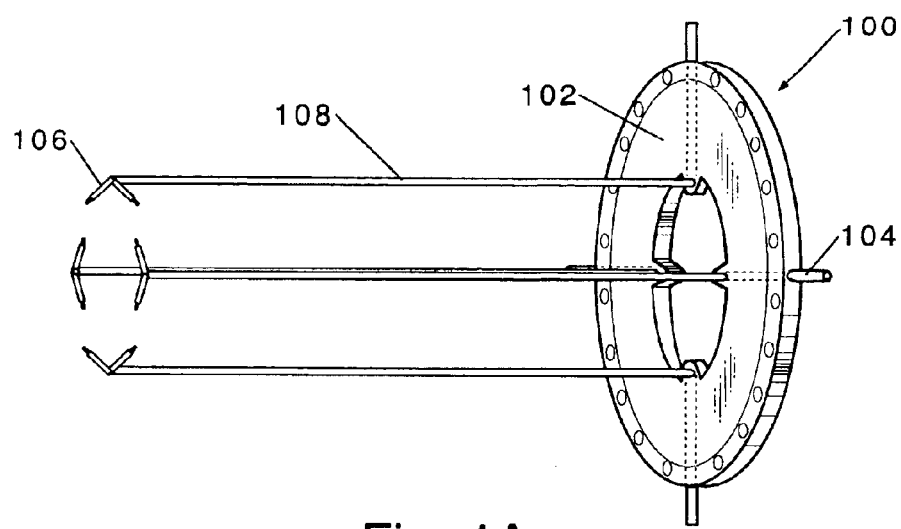
FIG. 1A shows a three dimensional view of a spray device according to the present invention.

In the following detailed description of preferred embodiments of the present invention, reference is made to the accompanying Drawings, which form a part hereof, and in which are shown by way of illustration specific embodiments in which the present invention may be practiced. It should be understood that other embodiments may be utilized and changes may be made without departing from the scope of the present invention.

Fluid barriers according to the present invention are formed by spraying a fluid along the internal surface of ductwork. The ductwork conveys a gaseous mixture comprising volatile metal chlorides and one or more fluids. When the barrier fluid is sprayed along the internal surfaces of the ductwork, it is at a lower temperature than the gaseous mixture.

When the barrier fluid is sprayed along the internal surface of the ductwork, it effectively forms a fluid barrier between the gaseous mixture and the internal surface of the ductwork. In order to come in contact with the internal surface of the ductwork, chlorides in the gaseous mixture must pass through the fluid barrier, which is at a lower temperature than the chlorides in the gaseous mixture. The barrier fluid prevents the chlorides from contacting the internal surface of the ductwork for some distance through the ductwork. As the barrier fluid and the gaseous mixture pass through the ductwork the barrier fluid and the mixture will begin to mix and chlorides will begin to enter the fluid barrier. As chlorides enter and pass through the fluid barrier, the lower temperature of the fluid barrier causes a reduction in the temperature of the chlorides and ultimately in the tackiness of the chlorides. Thus, in one aspect the present invention works by preventing the chlorides from reaching the walls of the duct. The present invention also works by reducing the temperature of the chlorides to below the temperature at which they are tacky, before the chlorides can come in contact with the surface of the ductwork.

Typically, the gaseous mixture enters into the ductwork from a reaction vessel such as a chlorinator. Preferably, the barrier fluid is introduced into the ductwork by spraying the barrier fluid at a point that is as close to the reaction vessel as is feasible. If the fluid spray is introduced at a point that is too far away from the reaction vessel, then the chlorides may clog the ductwork at a point that is prior to the point at which the fluid spray is introduced.

As the barrier fluid and the gaseous mixture are conveyed through the ductwork, two observations can be made. First, heat from the gaseous mixture is gradually absorbed by the fluid barrier, causing the temperature of the gaseous mixture to decrease and the temperature of the barrier fluid in the fluid barrier to rise. Second, the barrier fluid gradually mixes with the gaseous mixture. If the gaseous mixture remains in the ductwork long enough, the barrier fluid and the gaseous mixture will eventually reach the same temperature and substantially all of the barrier fluid will mix with the gaseous mixture. Preferably, at this point the temperature of the gaseous mixture will have decreased to below the temperature at which the chlorides adhere to the interior surfaces of the ductwork. However, if the temperature of the gaseous mixture at this point is such that the chlorides are still tacky, additional barrier fluid, at a lower temperature than the gaseous mixture, can be introduced into the ductwork at a subsequent point to form additional fluid barrier.

The number of points at which barrier fluid should preferably be introduced into the ductwork depends on a number of factors, including the length of the ductwork, the composition of the gaseous mixture, the amount of gaseous mixture being conveyed through the ductwork, the temperature of the gaseous mixture when it enters the ductwork, the composition of the barrier fluid, the amount of barrier fluid introduced into the ductwork at each point, and the temperature of the barrier fluid as it is introduced into the ductwork. Generally, the length of the ductwork, the composition of the gaseous mixture, the amount of gaseous mixture being conveyed through the ductwork, and the temperature of the gaseous mixture when it enters the ductwork is determined by the particular application. The composition of the barrier fluid, the temperature of the barrier fluid as it is introduced into the ductwork, the number of points at which the barrier fluid is introduced into the ductwork, and the amount of barrier fluid introduced at each point is chosen to reduce or substantially eliminate the amount of chlorides that adhere to the surface of the ductwork.

In a preferred embodiment, the barrier fluid is a material which is already found in the gaseous mixture. Thus, the gradual mixing of the barrier fluid with the gaseous mixture does not add a new component to the composition of the gaseous mixture. In another preferred embodiment, the barrier fluid is in a liquid state when introduced into the ductwork. In this preferred embodiment, the barrier fluid changes from a liquid state to a gaseous state (that is, is vaporized) as it absorbs heat from the gaseous mixture. In this manner, the heat of vaporization of the liquid barrier fluid is effectively utilized in absorbing heat from the gaseous mixture. Once the barrier fluid absorbs enough heat to change from a liquid to a gas it will more readily mix with the gaseous mixture, which remains in a gaseous state. In another preferred embodiment, the barrier fluid is both a component of the gaseous mixture and is in a liquid state when introduced into the ductwork.

The present invention can be advantageously utilized in processes for the production of titanium tetrachloride ("$TiCl_4$"), significantly reducing the buildup of impurity chlorides in the chlorinator crossover that conveys the off-gases from the chlorination process in a chlorinator to a cyclone. The off-gases (that is, a gaseous mixture) from the chlorination process contain $TiCl_4$ as a result of the chlorination of $TiO_2$ in the chlorinator. The off-gases will typically also contain CO, $CO_2$, $N_2$, and $Cl_2$ as well as volatile chlorides of impurities found in conventional titanium dioxide-containing ores, for example, iron, manganese, nickel, silicon, aluminum, niobium, zirconium, vanadium, magnesium and calcium. The $TiCl_4$-containing off-gases typically leave the chlorinator and enter the crossover at a temperature from about 800° C. to about 1400° C. Preferably, the barrier fluid for this application comprises nitrogen ("$N_2$"), carbon dioxide ("$CO_2$"), or titanium tetrachloride ("$TiCl_4$"). More preferably, the barrier fluid comprises $TiCl_4$.

In a preferred embodiment, $TiCl_4$ is utilized as the barrier fluid and is sprayed into the chlorinator crossover ductwork along the surface of the ductwork, forming a fluid barrier. In a more preferred embodiment, the $TiCl_4$ barrier fluid is in a liquid state and is sprayed into the chlorinator crossover at a temperature below the boiling point of $TiCl_4$, about 136.4° C. (277.5° F.). More preferably, the liquid $TiCl_4$ barrier fluid is sprayed into the ductwork at a temperature from about 60° F. (15.6° C.) to about 100° F. (37.8° C.). Advantageously, the liquid $TiCl_4$ barrier fluid is comprised of $TiCl_4$ which has been recovered from the off-gases (by the removal of solids and condensing gaseous $TiCl_4$ to liquid form) and recycled to the process. Typically, the ductwork between the chlorinator and the cyclone will be from about 8 feet (2.44 meters) in length to about 16 feet (4.88 meters) in length. As the chlorinator off-gases travel through the ductwork, the barrier fluid absorbs heat from the off-gases, causing the temperature of the off-gases to decrease and the temperature of the $TiCl_4$ barrier fluid to increase. Upon exiting the ductwork, the temperature of the off-gases will preferably be greater than the boiling point of $TiCl_4$, and more preferably greater than about 375° F. (190.6° C.). Thus, from the time the liquid $TiCl_4$ barrier fluid is sprayed into the ductwork until it exits the ductwork, the temperature of the barrier fluid will increase to a temperature that is greater than its boiling point, causing the barrier fluid to change from a liquid state to a gaseous state. The heat of vaporization needed to change the barrier fluid from a liquid state to a gaseous state helps cool the off-gases. Once in a gaseous state, the $TiCl_4$ barrier fluid can more readily mix with the off-gases. As the mixture of off-gases and $TiCl_4$ barrier fluid exits the ductwork, the temperature of the mixture will preferably be less than about 450° F. (232° C.).

The amount of barrier fluid needed to create an effective fluid barrier may vary between different applications of the present invention. However, one of ordinary skill in the art can determine an appropriate amount without undue experimentation.

Figure 1B:
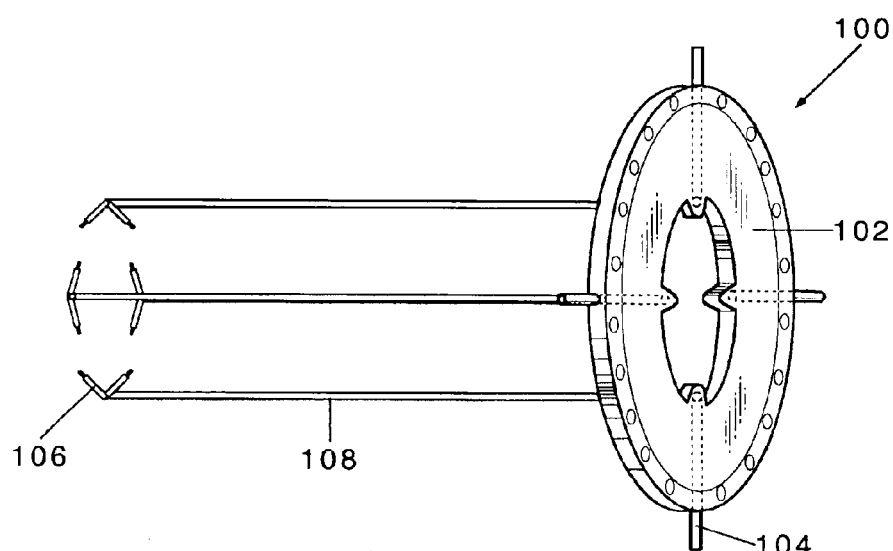
FIG. 1B shows another three dimensional view of the spray device shown in FIG. 1A.
Figure 2:
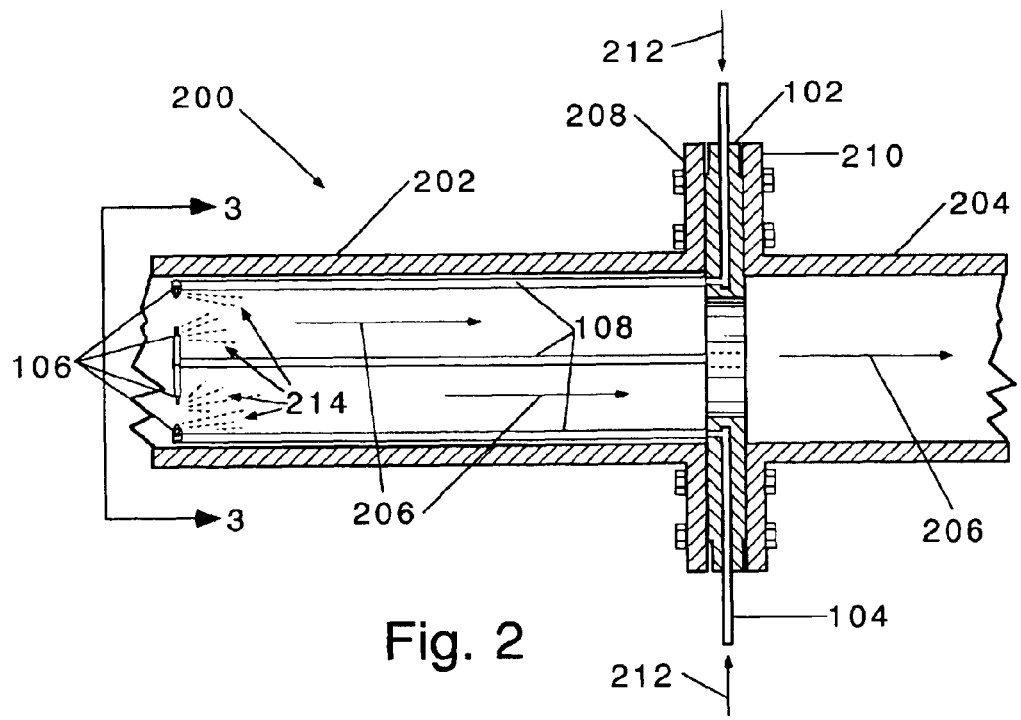
FIG. 2 shows a cross-sectional view of a spray device and ductwork as used according to the present invention.
Figure 3:
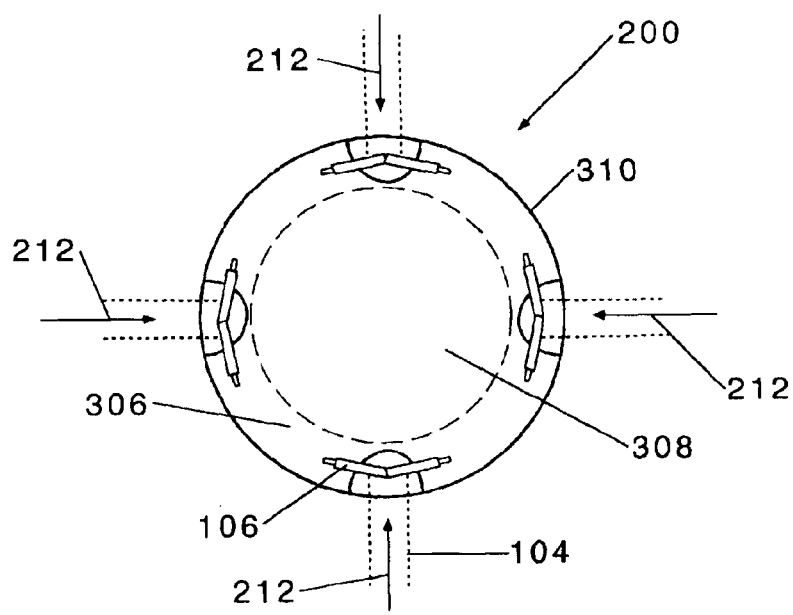
FIG. 3 shows another cross-sectional view of the spray device and ductwork shown in FIG. 2.
Figure 4:
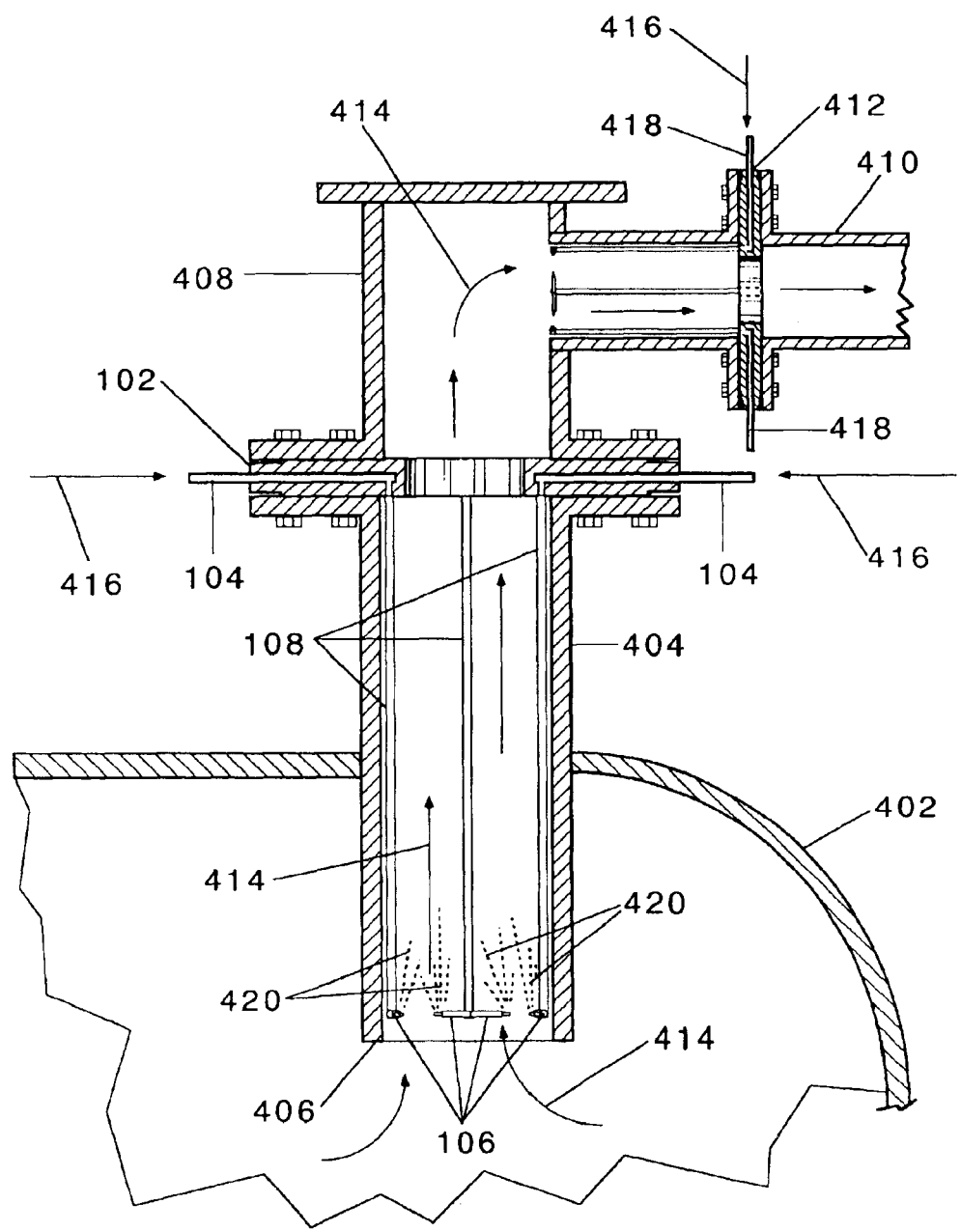
FIG. 4 shows a cross-sectional view of a spray device, chlorinator, and ductwork according to the present invention.

Spray devices can be advantageously used to create fluid barriers in accordance with the present invention. Generally, such spray devices will comprise a means for attaching the spray device to ductwork; an inlet capable of receiving fluid from a fluid supply external to the ductwork; a nozzle capable of spraying fluid along the inside surface of the ductwork; and a conduit connecting the inlet to the nozzle, providing for communication of fluid from the inlet to the nozzle. FIGS. 1A and 1B show three dimensional views of an example of a spray device 100 that can be advantageously utilized in accordance with the present invention to spray a liquid barrier fluid into ductwork conveying a gaseous mixture. The spray device 100 comprises a flange 102, four inlets 104, eight nozzles 106, and four nozzle connecting conduits 108. The flange 102 is utilized to attach the spray device 100 to sections of the ductwork as illustrated in FIG. 2 and explained below. The inlets 104 receive barrier fluid from a supply of barrier fluid external to the ductwork. Spray devices of the present invention comprise at least one inlet and preferably comprise two or more inlets. The nozzle connecting conduits 108 connect the inlets 104 to the nozzles 106, providing for communication of the barrier fluid from the inlets 104 to the nozzles 106. The nozzle connecting conduits 108 also allow for the nozzles 106 to be positioned inside ductwork at a distance (that is, the length of the connecting conduits 108) from the flange 102. In the spray device 100, each nozzle connecting conduit 108 connects one inlet 104 to two nozzles 106. However, other configurations are within the scope of the present invention, such that generally connecting conduits may connect an inlet to one or more nozzles. During the operation of the spray device 100, barrier fluid enters each inlet 102, travels through the nozzle connecting conduits 108, and exits the spray device 100 into the ductwork via the nozzles 106. As the spray device 100 is utilized, the nozzle connecting conduits 108 and the nozzles 106 are in close proximity to or touching the internal surface of the ductwork.

FIG. 2 shows a cross-sectional view of ductwork 200 according to the present invention comprising the spray device 100 attached to sections of ductwork 202 and 204. The spray device 100 is positioned such that the nozzle connecting conduits 108 and nozzles 106 are positioned in close proximity or touching the inside surface 310 of the ductwork section 202. Both of the ductwork sections 202 and 204 have flanges that are bolted to the flange 102 of the spray device 100. In FIG. 2, the arrows 206 indicate the flow direction of the gaseous mixture. FIG. 3 shows another cross-sectional view of the ductwork 200. During operation of the spray device 100, the barrier fluid 212 enters the inlets 104, travels through the nozzle connecting conduits 108, and exits the nozzles 106 in a spray pattern 214 to form a fluid barrier 306, which in the vicinity of the nozzles 106 preferably covers the inner circumference of the ductwork section 202 and extends in this condition for some distance with the flow of the gaseous mixture 308.

As has been discussed, the fluid barrier 306 produced by a given spray device will dissipate over time with vaporization of the barrier fluid and through mixing with the gaseous mixture 308, but preferably a substantially continuous fluid barrier 306 will be maintained (through the use of one or more appropriately spaced spray devices 100, for example) to cool the chlorides in gaseous mixture 308 to a point where they will not foul the inside surface 310 of the ductwork in the absence of an effectively circumferentially continuous fluid barrier 306.

FIG. 4 shows the spray device 100 of FIGS. 1–3 placed in chlorinator crossover ductwork attached to a chlorinator 402. A first section 404 of the ductwork juts into the top of the chlorinator 402. The length of the nozzle connecting conduits 108 is designed to place the nozzles 106 near that end 406 of the first ductwork section 404 which extends into the chlorinator 402, so that chloride buildup is effectively avoided at the end 406 and in subsequent, downstream portions of the ductwork section 404.

In FIG. 4, the flange 102 of the spray device 100 is placed between and attached to the first ductwork section 404 and a second ductwork section 408. Similarly the flange 412 of a second spray device is placed between the second ductwork section 408 and a third ductwork section 410. During operation of the spray device 100 in FIG. 4, off-gases 414 in the chlorinator 402 enter the ductwork through the end 406 of the first ductwork section 404 and travel through the ductwork in the direction indicated by the arrows 414. Barrier fluid 416 enters the inlets 104 of the first spray device 100, travels through the nozzle connecting conduits 108, and exits the nozzles 106 in a spray pattern 420 to create a fluid barrier, as described above in conjunction with FIG. 3, as it flows from adjacent the end 406 along the inside surface of the ductwork 404 (in the same direction as the gaseous mixture flow). Similarly, barrier fluid 416 enters the second spray device through inlets 418 and sustains an effective fluid barrier between the chlorides in the gases 414 that would otherwise foul the ductwork and the interior surfaces of the ductwork, as the gases move through the second ductwork section 408 into and through the third ductwork section 410.

In one embodiment of the present invention, the off-gases from a chlorinator are introduced into the crossover ductwork at a rate of about 4000 cubic feet per minute. The off-gases will typically be at a temperature between about 800° C. and about 1400° C. A liquid $TiCl_4$ barrier fluid is introduced into the ductwork leading from the chlorinator via a spray device, such as the ones described herein, at a temperature between about 60° F. (15.6° C.) and about 100° F. (37.8° C.) and at a rate from about 8 gallons (30.3 liters) per minute to about 10 gallons (37.9 liters) per minute.

While the present invention has been described in detail with respect to specific embodiments thereof, it will be appreciated that those skilled in the art, upon attaining an understanding of the foregoing, may readily conceive of alterations to, variations of and equivalents to these embodiments. Accordingly, the scope of the present invention should be assessed as that of the appended claims and by equivalents thereto.

What is claimed is:

1. A method for reducing solids buildup on an internal surface of ductwork between a reactor and subsequent product separation and recovery apparatus for conveying, at a first temperature, a gaseous product mixture containing materials which are otherwise deposited on the ductwork as tacky solids at said first temperature, comprising the step of introducing a barrier fluid at a second temperature, lower than the first temperature, along the internal surface of the ductwork to form a fluid barrier.

2. A method according to claim 1, wherein the materials otherwise deposited as tacky solids include volatile metal chlorides.

3. A method according to claim 2, wherein the volatile metal chlorides contain one or more chlorides selected from the group consisting of chlorides of Fe, Mn, Ni, Si, Al, Nb, Zr, V, Mg, and Ca.

4. A method according to claim 1, wherein the chlorides include solid chlorides.

5. A method according to claim 1, wherein the barrier fluid is a liquid at the second temperature.

6. A method according to claim 1, wherein the barrier fluid is comprised of a material already present in the gaseous mixture.

7. A method for reducing chloride buildup on the internal surface of ductwork conveying, at a first temperature, a gaseous mixture containing such chlorides, comprising the step of introducing a barrier fluid at a second temperature, lower than the first temperature, along the internal surfaces of the ductwork to form a fluid barrier, wherein the barrier fluid is a liquid at the second temperature.

8. A method according to claim 7, wherein the barrier fluid and second temperature are chosen so that the barrier fluid is vaporized in the ductwork.

9. A method according to claim 7, wherein the barrier fluid is comprised of a material already present in the gaseous mixture.

10. A method for reducing chloride buildup on the internal surface of ductwork conveying, at a first temperature, a gaseous mixture containing volatile metal chlorides and titanium tetrachloride, comprising the step of introducing a barrier fluid at a second temperature, lower than the first temperature, along the internal surfaces of the ductwork to form a fluid barrier.

11. A method according to claim 10, wherein the barrier fluid comprises nitrogen, carbon dioxide, or titanium tetrachloride.

12. A method according to claim 10, wherein the barrier fluid is titanium tetrachloride.

13. A method according to claim 10, wherein the barrier fluid is a liquid.

14. A method according to claim 10, wherein the first temperature is from about 800° C. to about 1400° C.

15. A method according to claim 10, wherein the second temperature is from about 60° F. (15.6° C.) to about 100° F. (37.8° C.).

16. A method for reducing chloride buildup on the internal surface of ductwork conveying, at a first temperature, a gaseous mixture containing volatile metal chlorides and titanium tetrachloride, comprising the step of spraying liquid titanium tetrachloride at a second temperature, lower than the first temperature, along the internal surface of the ductwork to form a fluid barrier.

17. A method according to claim 16, wherein the first temperature is from about 800° C. to about 1400° C.

18. A method according to claim 16, wherein the second temperature is from about 60° F. (15.6° C.) to about 100° F. (37.8° C.).

\* \* \* \* \*